(12) United States Patent
Lee

(10) Patent No.: US 7,584,041 B2
(45) Date of Patent: Sep. 1, 2009

(54) WHEEL SLIPPAGE DETECTION FOR DRIVETRAIN CONTROL

(75) Inventor: Chunhao J. Lee, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 32 days.

(21) Appl. No.: 12/021,704

(22) Filed: Jan. 29, 2008

(65) Prior Publication Data

US 2009/0192017 A1 Jul. 30, 2009

(51) Int. Cl.
  *G06F 7/00* (2006.01)
(52) U.S. Cl. .............................. 701/67; 701/51; 701/55; 701/56
(58) Field of Classification Search .................. 477/34, 477/35, 73, 74, 107; 701/51, 55, 56, 63, 701/58, 67, 68
See application file for complete search history.

(56) References Cited

U.S. PATENT DOCUMENTS 6,411,879 B2 *  6/2002  Kupper et al. ................. 701/51
6,421,599 B1 *  7/2002  Lippa et al. .................. 701/102
6,516,216 B1 *  2/2003  Fontenot et al. ............. 600/473
6,526,343 B2 *  2/2003  Saito et al. ..................... 701/51
6,560,522 B2 *  5/2003  Katakura et al. .............. 701/54

\* cited by examiner

*Primary Examiner*—Richard M. Camby
(74) *Attorney, Agent, or Firm*—John A. Miller; Miller IP Group, PLC

(57) ABSTRACT

A method for preventing a torque converter clutch that controls the slip in a torque converter between a vehicle engine and transmission from locking up in response to wheel slip from one or more of the vehicle wheels. The method includes monitoring the vehicle speed and/or the transmission output speed, and converting the speed to an acceleration. An average of the acceleration is provided over a predetermined number of sample points. The method then determines whether the current acceleration exceeds the average acceleration by a predetermined amount. If the current acceleration does exceed the average acceleration, then the method causes the converter slip to be held at its current value so that the torque converter does not lock up. Additionally, the method prevents the transmission from changing gears. The method then monitors whether the acceleration has fallen below a predetermined value or a predetermined period of time has expired.

18 Claims, 2 Drawing Sheets

WHEEL SLIPPAGE DETECTION FOR DRIVETRAIN CONTROL

BACKGROUND OF THE INVENTION

1. Field of the Invention

This invention relates generally to a system and method for controlling an automatic transmission in a vehicle and, more particularly, to a system and method for preventing a change in torque converter slip and/or transmission gear shift position in response to a sudden increase in the acceleration of the transmission or vehicle speed as a result of wheel slip or any event that may cause an abrupt change in driveline speed.

2. Discussion of the Related Art

Internal combustion engine vehicles that employ automatic transmissions typically include a torque converter positioned between the engine and the transmission of the vehicle. A torque converter is a fluid coupling device typically including an impeller coupled to an output shaft of the engine and a turbine coupled to the input shaft of the transmission. The torque converter uses hydraulic fluid to transfer rotational energy from the impeller to the turbine. Thus, the torque converter can disengage the engine crank shaft from the transmission input shaft during vehicle idling conditions to enable the vehicle to stop and/or to shift gears.

The rotational speed of the impeller relative to the turbine in the torque converter is typically different so that there is a converter slip therebetween. Because large slips between the engine output and the transmission input significantly affect the fuel economy of the vehicle, vehicles employ a torque converter clutch (TCC) for controlling or reducing the slip between the engine and the transmission. The TCC can also mechanically lock the impeller at the output of the engine to the turbine at the input of the transmission so that the engine and transmission rotate at the same speed. Locking the impeller to the turbine is generally only used in limited circumstances because of various undesirable implications.

Thus, a TCC generally has three modes. A fully locked mode as just described, a fully released mode and a controlled slip mode. When the TCC is fully released, the slip between the impeller and the turbine of the torque converter is only controlled by the hydraulic fluid therebetween. In the slip mode, the TCC is controlled by the pressure of hydraulic fluid in the torque converter so that the slip between the torque converter impeller and the turbine can be set so that it does not exceed a predetermined slip.

A conventional gearshift schedule for automatic transmissions is implemented in the form of shift maps. A shift map is a group of table look-up functions that define gearshift points based on vehicle speed and throttle opening. Consequently, each gearshift point defined using conventional gearshift scheduling is a function of vehicle speed and throttle opening, and does not compensate for varying vehicle conditions, such as varying vehicle loads, or road conditions, such as road grade and curvature. However, it is desirable to dynamically generate gearshift points that use a combination of inputs that compensate for varying vehicle and road conditions to achieve optimal fuel economy, performance and drivability.

As a vehicle travels along the road, it is not uncommon that the conditions of the road can affect the speed of the driveline and transmission of the vehicle. For example, when one or more of the vehicle tires lose contact with the road surface as a result of road bumps or the like, vehicle slip may occur which causes the driveline to spin much faster in a short period of time. When the change in speed between the transmission and the engine is detected by various speed sensors, typically the transmission controller will cause the torque converter clutch to increase the converter slip between the engine and the transmission, possibly causing TCC lock-up. The abrupt change in the speed also can trigger a gear shift. Therefore, it would be desirable to detect such a condition so that the transmission controller can prevent the TCC from locking up or changing gear, which is generally undesirable.

SUMMARY OF THE INVENTION

In accordance with the teachings of the present invention, a method is disclosed for preventing a torque converter clutch that controls the slip in a torque converter between a vehicle engine and transmission from locking up in response to wheel slip from one or more of the vehicle wheels. The method includes monitoring the vehicle speed and/or the transmission output speed, and converting the speed to acceleration. An average of the acceleration is provided over a predetermined number of sample points. The method then determines whether the current acceleration exceeds the average acceleration by a predetermined amount. If the current acceleration does exceed the average acceleration, then the method causes the converter slip to be held at its current value so that the torque converter does not lock up. Additionally or alternately, the method can prevent the transmission from changing gears. The method then monitors whether the acceleration has fallen below a predetermined value or a predetermined period of time has expired. If either of these conditions has occurred, then the method stops holding the converter slip and/or preventing transmission gear change, otherwise the converter slip is still held and/or the transmission gears are prevented from being changed.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for holding a torque converter slip and/or preventing a transmission gear change in a vehicle in response to an increase in transmission speed as a result of wheel slip is merely exemplary in nature, and is in no way intended to limit the invention or its applications or uses.

Figure 1:
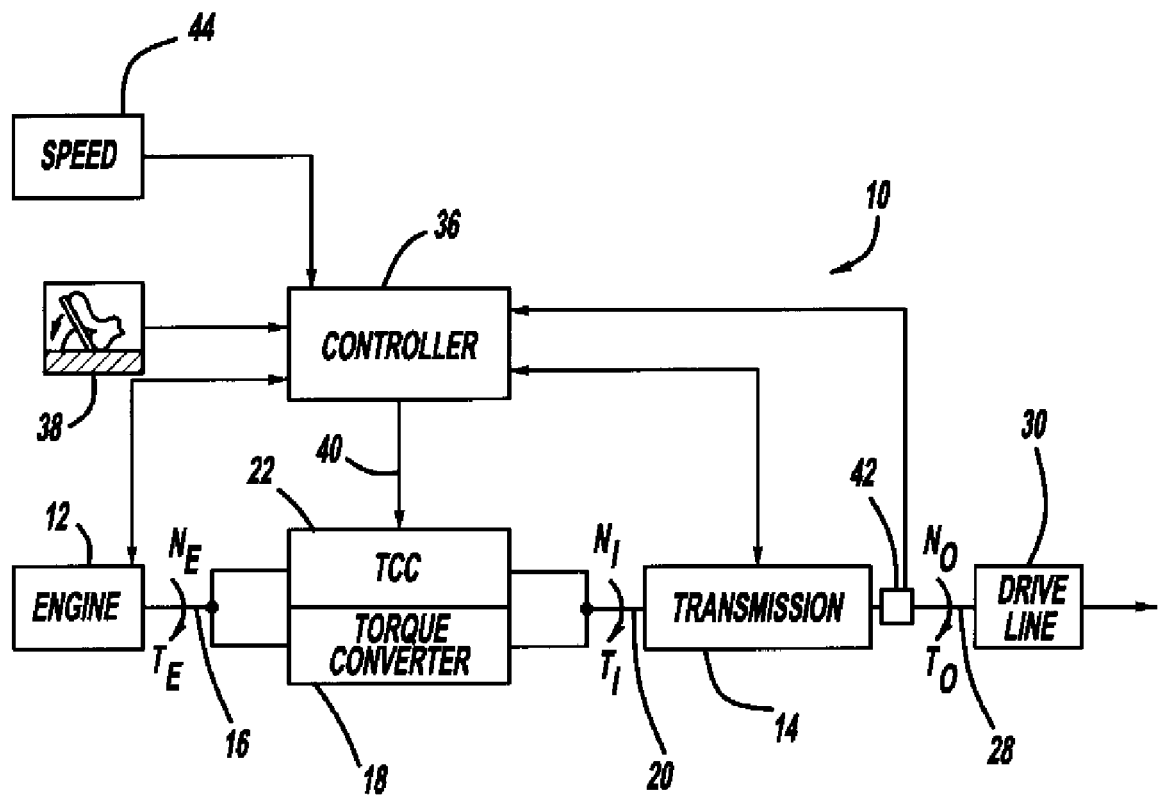
FIG. 1 is a schematic block diagram of a vehicle drivetrain including an engine, torque converter, transmission and driveline.

FIG. 1 is a block diagram of various powertrain components of a vehicle 10. The powertrain components include an engine 12 and a transmission 14. An output shaft of the engine 12, represented by line 16, is coupled to one end of a torque converter 18, and an input shaft of the transmission 16, represented by line 20, is coupled to an opposite end of the torque converter 18. As discussed above, the torque converter 18 transfers rotational energy from the engine 12 to the transmission 14 using hydraulic fluid so that the engine 12 can be disengaged from the transmission 14 when necessary. A TCC 22 sets a torque converter slip in the torque converter 18 between the engine 12 and the transmission 14, as discussed above. In this diagram, engine output power is depicted as engine rotational speed $N_E$ measured in revolutions per minutes and engine torque $T_E$ measured in Newton/meters. Likewise, the speed of the transmission 14 at its input is represented by transmission input speed $N_I$ and transmission torque $T_I$. The torque slip in the torque converter 18 is defined as $N_E$–$N_I$. An output shaft of the transmission 14, represented as line 28, is coupled to a driveline 30 of the vehicle 10 that distributes the engine power to the vehicle wheels (not shown) in a manner that is well understood to those skilled in the art. The speed of the output shaft of the transmission 14 is represented as $N_O$ and the torque of the output shaft of the transmission 14 is represented at $T_O$.

The vehicle 10 also includes an engine controller 36. The controller 36 receives a throttle position signal from a vehicle throttle 38, and provides a signal to the engine 12 to provide the necessary engine speed and a signal to the transmission 14 to provide the necessary gear to satisfy the throttle demand. Additionally, depending on the selected engine speed and transmission gear, the controller 36 provides a signal on line 40 to the TCC 22 to set the desired torque converter slip. A sensor 42 measures the rotational speed of the output shaft 28 of the transmission 14 and sends a speed signal to the controller 36 as is typical in these types of vehicles. A sensor 44 measures the speed of the vehicle and sends a speed signal to the controller 36.

Figure 2:
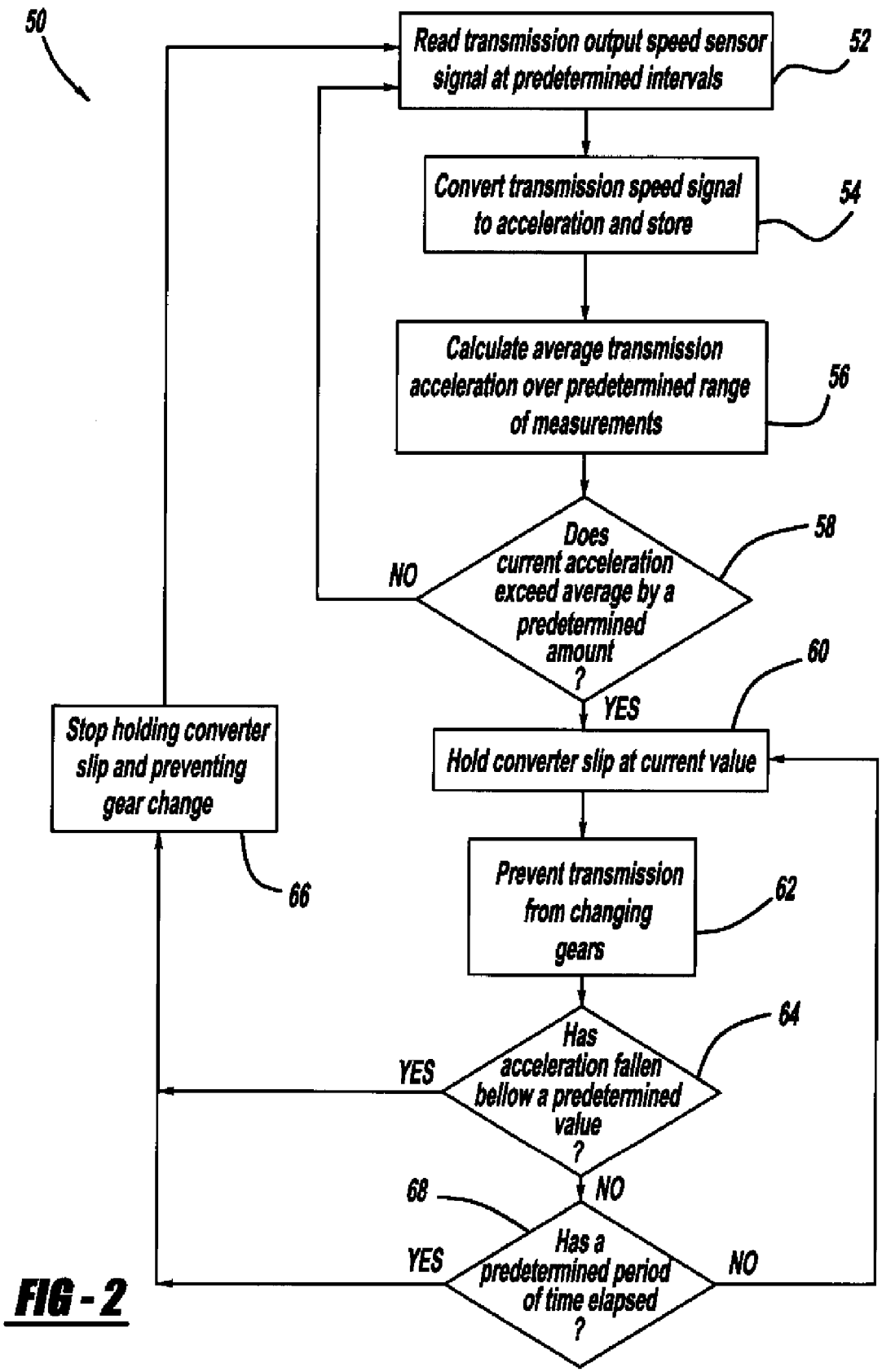
FIG. 2 is a flow chart diagram showing a method for preventing torque clutch converter lock-up in response to wheel slip, according to an embodiment of the present invention.

FIG. 2 is a flow chart diagram 50 showing a method for preventing the TCC 22 from locking up in response to a sudden increase in the speed of the transmission 16 as a result of wheel slip or any event that may cause an abrupt change in driveline speed, according to an embodiment of the present invention. The algorithm reads the sensor signal from the transmission output sensor 42 at predetermined sample points at box 52. The algorithm converts the transmission speed signals to acceleration signals and stores the acceleration signals at box 54. In an alternate embodiment, the algorithm may use the vehicle speed signal from the speed sensor 44 instead of the transmission output sensor 42. The algorithm then calculates a transmission acceleration average over a predetermined number of the stored transmission acceleration signals at box 56. The algorithm then determines whether the current transmission acceleration exceeds the average acceleration by a first predetermined value at decision diamond 58 and, if not, returns to the box 52 for reading the transmission output sensor signals.

If the current transmission acceleration does exceed the average acceleration by the predetermined value at the decision diamond 58, then the algorithm prevents the current clutch setting of the TCC 22 from changing so that the converter slip in the torque converter 16 is held and does not change at box 60. If the current acceleration does exceed the predetermined value, it is an indication that one or more of the wheels on the vehicle 10 is slipping where the transmission rotational speed would be significantly greater than the engine rotational speed. In this situation is would be desirable to hold the converter slip because increasing the converter slip may cause the TCC 22 to lock-up as a result of the wheel slip.

The algorithm can also prevent the transmission 18 from changing gears at box 62 if the current acceleration exceeds the predetermined value because the wheel slip otherwise may trigger an undesired up-shift, and when the wheel slip is removed, it may trigger a return down-shift. Controlling the TCC 22 and the transmission gears in this manner can be separate control strategies, and done independently of each other.

The algorithm then determines whether the acceleration has fallen below a second predetermined value, which may be less than the first predetermined value that caused the algorithm to hold the converter slip. If the transmission acceleration has fallen below the second predetermined value at the decision diamond 64, then the algorithm will stop holding the converter slip and preventing a gear change at box 66, where the wheel slip has stopped and the system can go back to operating normally.

If the transmission acceleration has not fallen below the second predetermined value at the decision diamond 64, meaning that the wheel slip may still be occurring, the algorithm determines whether a predetermined period of time has elapsed at decision diamond 68. If the predetermined period of time has not elapsed at the decision diamond 68, then the algorithm returns to the box 60 to hold the converter slip to the current value and the box 62 to prevent transmission gear changes. If the predetermined period of time has elapsed at the decision diamond 60, but the acceleration is still significantly above the average, then it may be desirable to now allow the TCC 22 to be locked up, where the algorithm stops holding the converter slip and preventing gear changes at the box 66.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling torque converter slip in a vehicle that includes an engine, a transmission and a torque converter therebetween, said method comprising:

reading a speed signal from a speed sensor on the vehicle at predetermined sample times;

converting the speed signals to acceleration signals and storing the acceleration signals;

calculating an acceleration average over a predetermined number of speed sensor readings;

determining whether a current acceleration signal exceeds the acceleration average by a first predetermined value;

holding the torque converter slip to a current value if the current acceleration signal does exceed the acceleration average by the first predetermined value;

determining whether the acceleration signal has fallen below a second predetermined value; and stopping holding the torque converter slip if the acceleration signal has fallen below the second predetermined value.

2. The method according to claim 1 further comprising preventing the transmission from changing gears if the current acceleration signal does exceed the acceleration average by the first predetermined value, and stopping preventing the gear change if the current acceleration signal falls below the second predetermined value.

3. The method according to claim 1 further comprising determining whether a predetermined period of time has expired if the converter slip is being held and, if so, stopping holding the torque converter slip.

4. The method to claim 1 further wherein reading a speed signal includes reading a transmission speed sensor signal.

5. The method according to claim 1 wherein reading a speed signal includes reading a vehicle speed signal.

6. The method according to claim 1 wherein the torque converter slip is controlled by a torque control clutch.

7. The method according to claim 1 wherein the second predetermined value is less than the first predetermined value.

8. A method for controlling transmission gears in a vehicle, said method comprising:

reading a speed signal from a speed sensor at an output of the transmission at predetermined sample times;

converting the speed signals to acceleration signals and storing the acceleration signals;

calculating an acceleration average over a predetermined number of speed sensor readings;

determining whether a current acceleration signal exceeds the acceleration average by a first predetermined value;

preventing the transmission from changing gears if the current acceleration signal does exceed the acceleration average by the first predetermined value;

determining whether the acceleration signal has fallen below a second predetermined value; and stopping preventing the transmission from changing gears if the acceleration signal has fallen below the second predetermined value.

9. The method according to claim 8 further comprising determining whether a predetermined period of time has expired if the transmission is preventing the gears from being changed and, if so, stopping preventing the transmission from changing gears.

10. The method according to claim 8 wherein the second predetermined value is less than the first predetermined value.

11. A system for controlling a torque converter slip in a vehicle that includes an engine, a transmission and a torque converter therebetween, said system comprising:

means for reading a speed sensor signal from a speed sensor on the vehicle at predetermined sample times;

means for converting the speed signals to acceleration signals and means for storing the acceleration signals;

means for calculation an acceleration average over a predetermined number of speed sensor readings;

means for determining whether a current acceleration signal exceeds the acceleration average by a first predetermined value;

means for holding the torque converter slip to a current value if the current acceleration signal does exceed the acceleration average by the first predetermined value;

means for determining whether the acceleration signal has fallen below a second predetermined value; and means for stopping holding the torque converter slip if the acceleration signal has fallen below the second predetermined value.

12. The system according to claim 11 further comprising means for determining whether a predetermined period of time has expired if the converter slip is being held and, if so, using the means for stopping holding the torque converter slip.

13. The system according to claim 11 further comprising means for preventing the transmission from changing gears if the current acceleration signal does exceed the acceleration average by the first predetermined value, and means for stopping preventing the gear change if the current acceleration signal falls below the second predetermined value.

14. The system according to claim 13 further comprising means for determining whether a predetermined period of time has expired if the gears are being prevented from being changed and, if so, using the means for stopping preventing the gear change.

15. The system according to claim 11 wherein the means for reading a speed signal includes means for reading a transmission speed sensor signal.

16. The system according to claim 11 wherein the means for reading a speed signal includes means for reading a vehicle speed signal.

17. The system according to claim 11 further comprising a torque control clutch for controlling the torque converter slip.

18. The system according to claim 11 wherein the second predetermined value is less than the first predetermined value.

* * * * *